United States Patent
Chenny et al.

(10) Patent No.: US 10,387,125 B2
(45) Date of Patent: *Aug. 20, 2019

(54) DYNAMICALLY BUILDING MOBILE APPLICATIONS

(71) Applicant: International Business Machines Corporation, Armonk, NY (US)

(72) Inventors: Rahul Chenny, Bangalore (IN); Mayank Jain, Bangalore (IN); Dhandapani Shanmugam, Bangalore (IN); Dinesh G. Venkatraman, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/834,785

(22) Filed: Dec. 7, 2017

(65) Prior Publication Data

US 2018/0101367 A1   Apr. 12, 2018

Related U.S. Application Data

(63) Continuation of application No. 14/797,650, filed on Jul. 13, 2015, now Pat. No. 9,886,246.

(51) Int. Cl.
  *G06F 8/36* (2018.01)
  *G06F 8/60* (2018.01)
  *G06F 8/61* (2018.01)

(52) U.S. Cl.
  CPC .............. *G06F 8/36* (2013.01); *G06F 8/61* (2013.01); *G06F 8/60* (2013.01)

(58) Field of Classification Search
  CPC .............. G06F 8/36; G06F 8/60; G06F 8/61
  See application file for complete search history.

(56) References Cited

U.S. PATENT DOCUMENTS 6,986,135 B2   1/2006   Leathers et al.
7,089,233 B2   8/2006   Osias
(Continued)

FOREIGN PATENT DOCUMENTS

WO   2012148867 A1   11/2012
WO   2013089768 A1   6/2013
WO   2013121293 A2   8/2013

OTHER PUBLICATIONS

Ricardo Erikson V. S. Rosa et al., "Smart composition of reusable software components in mobile application product lines," 2011 [retrieved Mar. 27, 2019], Proceedings of the 2nd International Workshop on Product Line Approaches in Software Engineering pp. 45-49, downloaded from <url>:https://dl.acm.org. (Year: 2011).*

(Continued)

*Primary Examiner* — Thuy Dao
*Assistant Examiner* — Stephen D Berman
(74) *Attorney, Agent, or Firm* — George R. McGuire; Bond Schoeneck & King, PLLC; John Pivnichny

(57) ABSTRACT

A method for dynamically assembling a mobile application includes the steps of: (i) receiving a plurality of artifacts from a programmer; (ii) storing the received plurality of artifacts in an artifacts database; (iii) receiving, from a user, a request for a dynamically assembled mobile application, the request comprising a plurality of parameters defining a desired output of the dynamically assembled mobile application; (iv) identifying, using the received plurality of parameters, a template for a mobile application configured to achieve the desired output; (v) identifying, using the identified template, a plurality of the artifacts stored in the artifacts database; (vi) assembling the identified plurality of artifacts into a mobile application comprising an installable file, wherein the assembled mobile application was previ- (Continued)

ously not available to the user; and (vii) making the installable file available to the user.

18 Claims, 4 Drawing Sheets

(56) References Cited

U.S. PATENT DOCUMENTS

| | | | |
|---|---|---|---|
| 7,134,122 B1 | 11/2006 | Park | |
| 7,149,747 B1 | 12/2006 | Cheng et al. | |
| 7,860,901 B2 | 12/2010 | Cheng et al. | |
| 8,458,658 B2 | 6/2013 | Faus et al. | |
| 8,489,648 B1* | 7/2013 | Rubin | G06F 8/36 707/802 |
| 8,671,147 B2 | 3/2014 | Jowett et al. | |
| 8,938,732 B2 | 1/2015 | Levine et al. | |
| 9,361,084 B1* | 6/2016 | Costa | G06F 8/61 |
| 9,547,482 B2 | 1/2017 | Soffer et al. | |
| 2003/0046275 A1 | 3/2003 | Osias | |
| 2003/0182656 A1 | 9/2003 | Leathers et al. | |
| 2004/0044694 A1* | 3/2004 | Henig | G06F 8/60 |
| 2005/0034099 A1* | 2/2005 | Spooner | G06F 8/36 717/104 |
| 2005/0192984 A1 | 9/2005 | Shenfield et al. | |
| 2006/0020937 A1 | 1/2006 | Schaefer | |
| 2008/0109801 A1 | 5/2008 | Levine et al. | |
| 2008/0307047 A1 | 12/2008 | Jowett et al. | |
| 2009/0254912 A1 | 10/2009 | Roundtree et al. | |
| 2011/0125838 A1* | 5/2011 | Rao | G06Q 30/02 709/203 |
| 2012/0089971 A1* | 4/2012 | Williams | G06F 8/61 717/167 |
| 2012/0124547 A1 | 5/2012 | Halbedel | |
| 2012/0254768 A1 | 10/2012 | Aggarwal et al. | |
| 2013/0024499 A1* | 1/2013 | Franco | G06F 8/60 709/203 |
| 2013/0036400 A1 | 2/2013 | Bak et al. | |
| 2013/0067427 A1 | 3/2013 | Fox et al. | |
| 2013/0104113 A1 | 4/2013 | Gupta et al. | |
| 2013/0124606 A1 | 5/2013 | Carpenter et al. | |
| 2013/0174012 A1* | 7/2013 | Kwan | G06F 8/36 715/234 |
| 2013/0305218 A1* | 11/2013 | Hirsch | G06F 8/30 717/106 |
| 2014/0108418 A1* | 4/2014 | Elbaum | G06F 17/30864 707/741 |
| 2014/0136519 A1 | 5/2014 | Latzina et al. | |
| 2014/0223408 A1 | 8/2014 | Wunderlich, Jr. et al. | |
| 2014/0282371 A1* | 9/2014 | Hirsch | G06F 8/36 717/106 |
| 2015/0089469 A1* | 3/2015 | Shakespeare | G06F 8/36 717/106 |
| 2015/0249673 A1 | 9/2015 | Niemoeller et al. | |
| 2015/0347093 A1 | 12/2015 | Dowd et al. | |
| 2015/0378703 A1 | 12/2015 | Govindaraju et al. | |
| 2016/0132309 A1 | 5/2016 | Rajasekhar et al. | |
| 2017/0212735 A1 | 7/2017 | Levi et al. | |

OTHER PUBLICATIONS

Fabiana Marinho et al., "MobiLine: A Nested Software Product Line for the domain of mobile and context-aware applications," 2013 [retrieved Mar. 27, 2019], Science of Computer Programming, vol. 78, Issue 12, pp. 2381-2398, downloaded from <url>:https://www.sciencedirect.com. (Year: 2013).*

Israel J. Mojica Ruiz et al., "Understanding reuse in the Android Market," 2012 [retrieved Mar. 27, 2019], 20th IEEE International Conference on Program Comprehension (ICPC), pp. 113-122, downloaded from <url>:https://ieeexplore.ieee.org. (Year: 2012).*

Ravi Bhoraskar, et al., User scripting on Android using BladeDroid, http://ravi.bhoraskar.com/papers/bladedroid.pdf, 2014, pp. 1-7.

Jeffrey Schiller, et al., Live programming of mobile apps in App Inventor, http://research.microsoft.com/en-US/events/promoto-2014-live-programming-in-app-inventor-revised.pdf, Mar. 2012, pp. 1-8.

seochotherapy.com, The Developing Desire for IOS and Android Applications in the Cellular Market, http://seochotherapy.com/xe/free/23077, Feb. 10, 2014, pp. 1-2.

Greenfield, Jack et al, "Software factories: assembling applications with patterns, models, frameworks and tools" 2003, Companion of the 18th annual ACM SIGPLAN conference on Object-oriented programming, systems, languages, and applications, pp. 16-27.

Satoh, Ichiro, "MobileSpaces: a framework for building adaptive distributed applications using a hierarchical mobile agent system," 2002 International Conference on Distributed Computing Systems, pp. 1-8.

Cappiello, Cinzia et al., "MobilMash: end user development for mobile mashups," 2012, pp. 473-474.

* cited by examiner

```xml
<?xml version="1.0" encoding="UTF-8"?>
    <DeveloperModule id = "Unique Id assigned to the developer">
        <Module Id = "1" Name="Module 1">

<Purpose element1 = "Value of element 1" element2 = "Value of element 2">
            <!-- State the intent of the module -->
            </Purpose>

<Context element1 = "Value of element 1" element2 = "Value of element 2">
            <!-- State the situations where this module would be leveraged/applied -->
            </Context>
            <Class>
                <!-- State the name of the class -->
                <Resources>
                <!-- List down all of the required resources for the class -->
                </Resources>
            </Class>
            <API>
                <Function>
                    <Name>
                    <!-- State the name of the function -->
                    </Name>
                    <Input>
                    <!-- List down the input parameters required -->
                    </Input>
                    <Output>
                    <!-- List down the output parameters required -->
                    </Output>
                </Function>
            </API>
        </Module>
        <!--
        :
        -->
        <Module Id = "N" Name="Module N">
            <!-- ... -->
        </Module>
    </DeveloperModule>
```

FIG. 4

DYNAMICALLY BUILDING MOBILE APPLICATIONS

CROSS-REFERENCE TO RELATED APPLICATIONS

This application is a continuation of U.S. application Ser. No. 14/797,650, filed on Jul. 13, 2015 and now allowed, entitled "Dynamically Building Mobile Applications, the entire contents of which are incorporated herein by reference in their entirety.

FIELD OF THE INVENTION

The present invention is directed to methods and systems for automatically and dynamically generating a mobile application for a variety of different contexts.

BACKGROUND

Mobile applications or "apps" are computer programs designed to run on computers such as smartphones, tablets, or other mobile computing devices. As these mobile computing devices have significantly improved their storage, processing speed and power, and battery life over the past decade, they are increasingly able to execute more powerful applications that utilize a wider set of features and tools.

Mobile apps are typically developed and compiled by an experienced computer programmer who makes the app available to potential users via an online marketplace or application distribution platform such as an app store. The app is typically categorized in the app store by purpose or other characteristic, and a user can search for and download the desired application. Many apps address problems across industries and are available across multiple platforms.

Most mobile operating systems, including popular systems such as Android and iOS, facilitate the development of mobile applications through a software development kit ("SDK"). The SDK usually comprises a set of rules and information for a programmer interested in developing a mobile application for that particular operating system. Some mobile operating systems will also include an emulator or simulator designed to allow the programmer to test the application before it is fully deployed.

Despite having an app development kit available, the development of mobile applications is time-consuming and can require extensive programming experience and knowledge. The app developer must build the app by statically including all of the required artifacts (source code, images, css, etc.) and uploading to the app store as an installable. However, this results in a "one-size-fits-all" approach in which an app has the same feature(s) for everyone that downloads the app, regardless of the need or preferences of the user. Consumers respond by downloading additional mobile apps to fit their needs or preferences, thereby leading to a crowded mobile device workspace and wasted resources.

Accordingly, there is a continued need in the art for the dynamic generation of mobile applications to fit the needs and preferences of the user for a variety of different contexts.

SUMMARY OF THE INVENTION

The disclosure is directed to inventive methods and systems for the dynamic generation of a mobile application by dynamically assembling one or more mobile app features at the app distribution platform and generating an installable mobile application for any given context. The app programmer develops and uploads to the distribution and/or generation platform only those artifacts required for one or more specific capabilities (such as executables, required prerequisite libraries, prerequisite non executable resources, etc.). The preferences and or needs of the user, which can be provided or characterized by the user's profile, social behavior, or other sources, can be utilized as input for the dynamic assembly or generation of the mobile application.

According to an aspect, a method for dynamically assembling a mobile application includes the steps of: (i) receiving, from a user, a request for a mobile application comprising at least one parameter; (ii) searching a profile database for a profile associated with the user; (iii) retrieving, from any identified profiles, a characteristic of the user; (iv) identifying a plurality of artifacts in a database of artifacts, wherein the plurality of artifacts are associated with the at least one parameter; (v) assembling the identified plurality of artifacts into a mobile application installable file; and (vi) making the installable file available to the user.

According to an embodiment, the at least one parameter is an output of the mobile application.

According to an embodiment, the at least one parameter is a function of the mobile application.

According to an embodiment, the method further includes the steps of: receiving a plurality of artifacts from a programmer; and storing the received plurality of artifacts.

According to an embodiment, the identified profile comprises information about at least one preference of the user.

According to an embodiment, the identified plurality of artifacts are required to satisfy the at least one parameter.

According to an aspect is a system for dynamically assembling a mobile application, the system comprising: (i) a mobile application distribution platform configured to receive a request from a user for a mobile application comprising at least one parameter; (ii) a profile database comprising a plurality of profiles; (iii) an artifacts database comprising a plurality of artifacts; (iv) wherein the mobile application distribution platform is further configured to identify in the profile database a profile associated with the user and retrieve from any identified profiles a characteristic of the user; wherein the mobile application distribution platform is further configured to identify a plurality of artifacts in the database of artifacts, the identified plurality of artifacts associated with the at least one parameter; and further wherein the mobile application distribution platform is configured to assemble the identified plurality of artifacts into a mobile application installable file.

According to an aspect is a computer program product for dynamically assembling a mobile application, the computer program product comprising a computer readable storage medium having program instructions embodied therewith to cause the computer to perform a method comprising the steps of: (i) receiving, by the computer, a request from a user for a mobile application comprising at least one parameter; (ii) searching, by the computer, a profile database for a profile associated with the user; (iii) retrieving, by the computer, a characteristic of the user from any identified profiles; (iv) identifying, by the computer, a plurality of artifacts in a database of artifacts, wherein the plurality of artifacts are associated with the at least one parameter; (v) assembling, by the computer, the identified plurality of artifacts into a mobile application installable file; and (vi) making, by the computer, the installable file available to the user.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

FIG. 4 is a screenshot of the schema of a DeveloperModule.xml file in accordance with an embodiment.

DETAILED DESCRIPTION OF EMBODIMENTS

The present disclosure is directed to embodiments of a method for dynamically assembling one or more mobile app features at an app distribution platform and generating an installable mobile application for any given context. The app programmer develops and uploads to the distribution and/or generation platform only those artifacts required for one or more specific capabilities (such as executables, required prerequisite libraries, prerequisite non executable resources, etc.). The preferences and needs of the user, which can be provided or characterized by the user's profile, social behavior, or other sources, can be utilized as input for the dynamic assembly or generation of the mobile application.

In view of the foregoing, a method is provided in which a user requests a mobile application with one or more features. In response to the user request, the app distribution platform dynamically generates the mobile app using one or more artifacts that the app developer(s) created and uploaded for storage with the platform. The dynamically generated app is then downloaded by the user.

Figure 1:
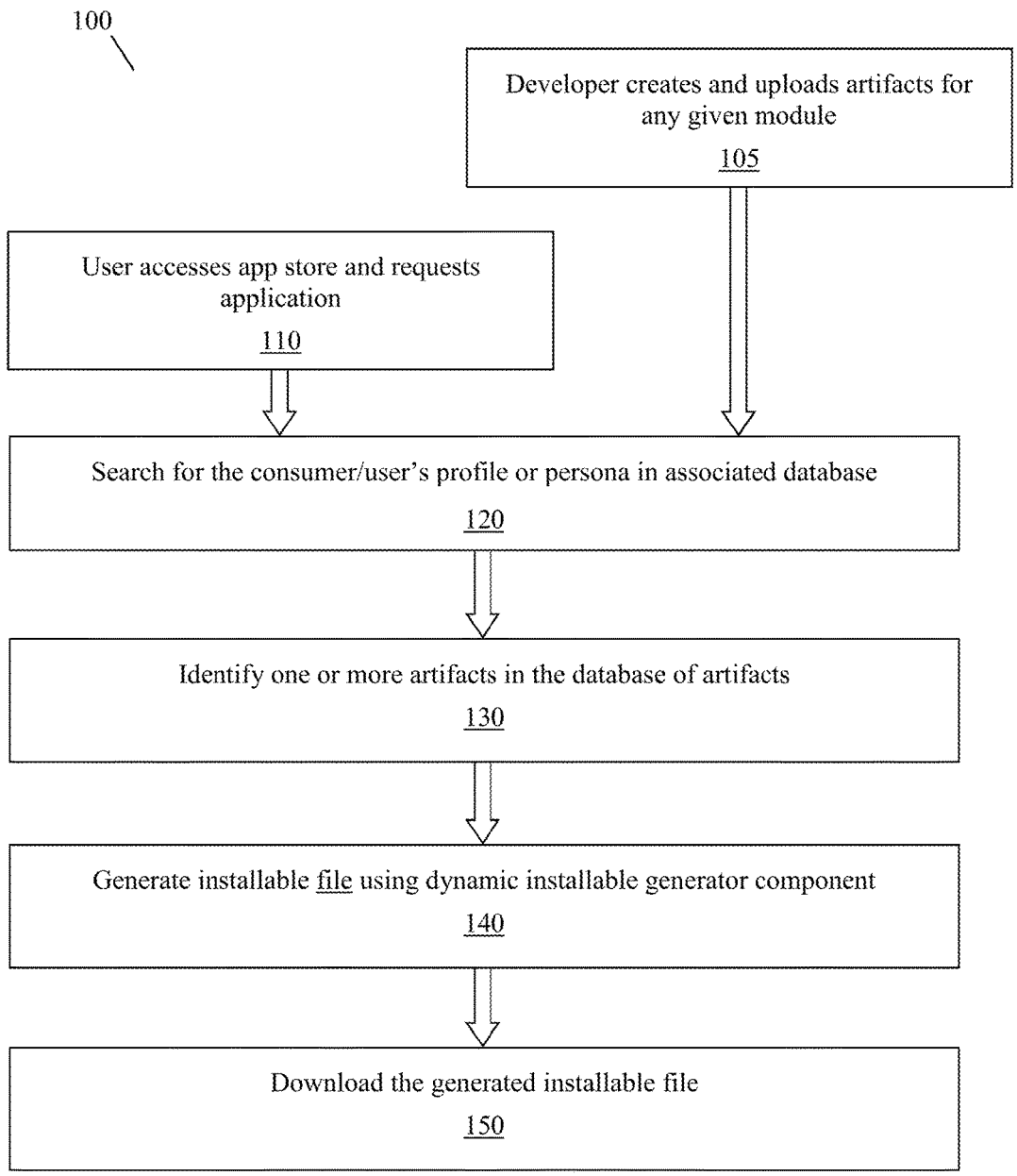
FIG. 1 is a flow chart of a method for dynamically assembling a mobile application in accordance with an embodiment.
Figure 2:
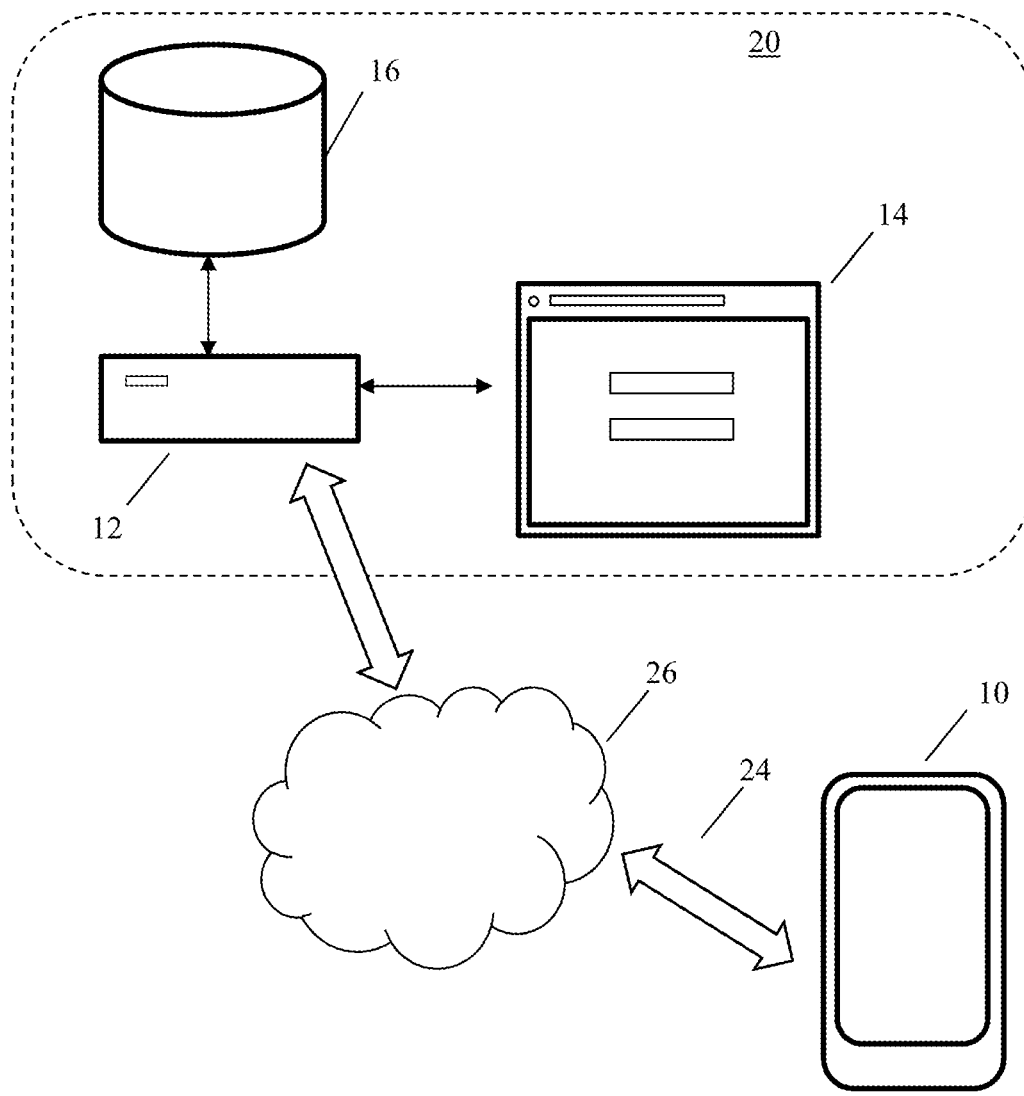
FIG. 2 is a schematic representation of a system for dynamically assembling a mobile application in accordance with an embodiment.
Figure 3:
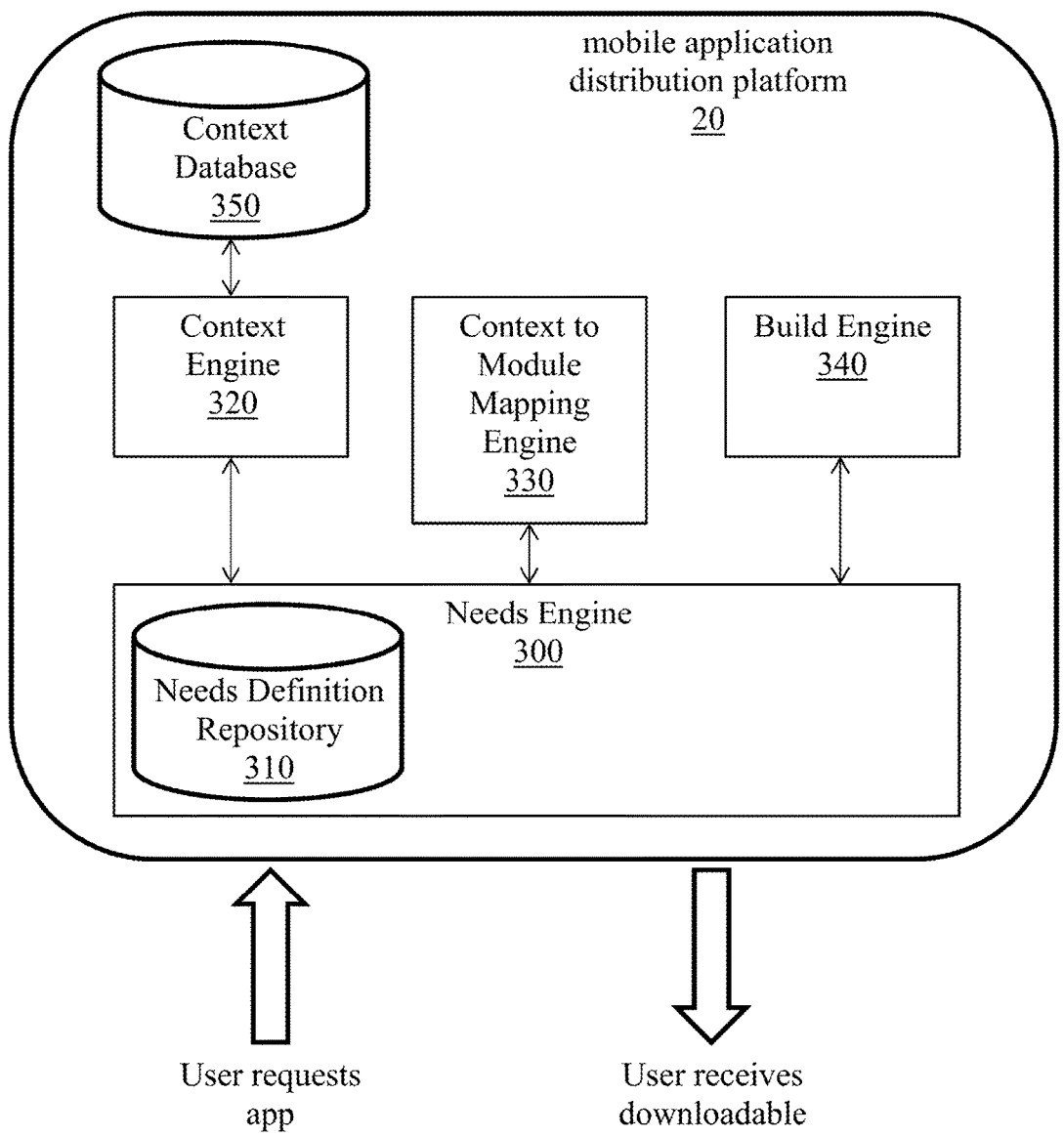
FIG. 3 is a schematic representation of a system for dynamically assembling a mobile application in accordance with an embodiment

Referring to FIG. 1 is a flowchart of a method 100 for dynamically generating a mobile application in response to a user request, in accordance with an embodiment. At step 110 of the method, the user navigates to the mobile application distribution platform 20 (see FIG. 2) and requests a mobile application. For example, the user expresses his need or request for a mobile application using verbal cues. This could be similar to the way a user currently expresses a need or request using a mobile application platform. The verbal cues can be very explicit ("weight loss app") or can be more verbose ("I want an app to help me keep track of food and weight"). A Needs Engine 300 (see FIG. 3) analyzes the need specified as input and can perform a lookup in a Needs Definition Repository 310 to identify what details are to be retrieved, where the details can be in the form of one or more associations. For example, the relationship between a need ("weight loss") and any necessary or desirable associated details or features—such as text font, color, sections, supplements, add-ons, etc.—are defined in the Needs Definition Repository 310.

According to an embodiment, Needs Engine 300 elucidates or determines the proper template and/or details from Needs Definition Repository 310 based on the characteristic Relative Positional Weight. For example, the user can request a mobile application by entering the text "Newspaper, adventure" which will relate to the term 'Newspaper' with a higher weight (e.g. weightage of 6 in a scale of 10) and as the Parent Category (/Newspaper) in the Needs Definition Repository. Additionally, "adventure" (e.g. 3 in a scale of 10) will be one of the associated Child Categories (/Newspaper/adventure).

According to another embodiment, Needs Engine 300 deciphers the proper template and/or details from Needs Definition Repository 310 using Dependency Association Weight. For example, the user can enter the text "I want a Newspaper app also containing adventure." The Needs Engine can determine that the request relates to "Newspaper" (e.g., weight of 6 in a scale of 10) as the Parent Category (/Newspaper) in the Needs Definition Repository, and that the word "containing" signifies the dependency of the word "adventure" as a Child Category (/Newspaper/adventure) depending from the Parent category. While Relative Positional Weight and Dependency Association Weight are example embodiments of Needs Engine 300, they are not the only possible embodiments.

The user can be any individual intending or interested in obtaining an app from the distribution platform. The user can connect to the mobile application distribution platform via a computing device 10 (see FIG. 2), which can be a smartphone, PDA, laptop, desktop, watch, or any other computing device capable of communicating a request and downloading, storing, or forwarding the resulting application. According to an embodiment, the computing device 10 connects to the mobile application distribution platform 20 via a wired or wireless connection 24. For example, connection 24 can be a cellular or WiFi connection to the Internet 26. As another example, connection 24 is a cellular, WiFi, or Bluetooth connection to an intranet or other wired or wireless network. According to an embodiment, the mobile application distribution platform 20 is a remote server or collection of servers associated with an app store or other platform.

According to an embodiment, the user's request for a mobile application includes a request for one or more features of a mobile application. For example, the requested feature may include any operation, feature, characteristic, tool, output, or other variable of known mobile applications. As just one example, the user may request a mobile application that can predict the weather and provides the output to the user at specific time(s) of day.

At step 105 of the method, which typically occurs before step 110, the app developer develops one or more artifacts for the dynamic mobile app generator. An artifact is any of the images, dependent libraries, executables, required prerequisite libraries, prerequisite non-executable resources, or any of the other components required for the mobile app to be generated and/or function. The programmer may create the one or more artifacts using a software development kit, for example, although many other methods are possible. According to an embodiment, the programmer, developer, or provider also provides test results for the feature artifacts. Once an artifact is uploaded, it can be validated by the mobile application platform.

At step 120 of the method, the mobile application distribution platform utilizes a context component to determine whether user context information associated with the request, such as the user's persona or profile, is available. If user context information is available, the platform retrieves it from the identified repository. For example, the platform may utilize one or more inputs from the user's request, including but not limited to the identity of the user, to query an associated database 16 (see FIG. 2) of users, personas, and/or profiles. The user context information is a valuable source of information about the user's social behaviors, preferences, and specific needs.

According to an embodiment, for example, Needs Engine 300 (see FIG. 3) analyzes the need input received from the user and initiates retrieval of user context information from the Context Engine 320, which is a data store or repository of information about the user which is acquired and filtered from disparate sources and or third-party, optionally with continuous updates. To ensure that only the relevant or specific context details are retrieved from the Context Engine, the Needs Engine can perform a lookup in Needs Definition Repository 310 to identify what details are to be retrieved, where the details can be in the form of one or more associations. For example, the relationship between a need ("weight loss") and any necessary or desirable associated details or features—such as text font, color, sections, supplements, add-ons, etc.—are defined in the Needs Definition Repository.

According to an embodiment, user context information can be obtained from a wide variety of locations, including but not limited to channels such as the web, mobile, social, forums, and others. User context information can be mined from interests and activities such as shopping (including wishlists and recent purchases), travel, and others. User context information can also come from service providers such as internet service providers, telecommunications service providers, businesses, and others. User context information can also be provided by third-party information providers such as cookies, user details, and so on. Other sources include browser history, search history, devices, and association information such as settings, location(s), time(s), needs, and others. Once the user context information is collected, it can be processed using analytics and can be stored in a Context Database 350 (see FIG. 3). Once the user context information is collected, it can be processed using analytics and can be stored in the Context Database.

As described above, requests to Context Database 350 (see FIG. 3) for user context information can be made via Context Engine 320. The Context Engine can query the Context Database for a match, which may be based on a variety of looks up or discovery mechanisms including phone number, phone identifier, user name, device identification, and many more. If the Context Database contains a large amount of data about the user, Needs Engine 300 can optionally identify one or more specific details or categories of specific details that it requires when it makes its request to the Context Engine. The stored and/or retrieved user context information can be classified into categories such as Applied Context which may be used to specify changes, customizations, font color, font size, and many other options. Another category is Retrieved Context which may be used to select the modules that will eventually be part of the installable.

At step 130 of the method (see FIG. 1), the platform identifies one or more artifacts or features in a database of stored artifacts or features that will solve the request by the user. This could involve, for example, an analysis of whether the identified one or more artifacts or features are compatible with each other in a compiled or assembled application. Alternatively, all features or artifacts could be designed or programmed such that they are compatible with all other features or artifacts. According to an embodiment, the platform can provide the programmer or developer with a set of standards to ensure that each feature will work independently and together with other components. Once the feature artifacts are uploaded by the programmer or developer they can be validated by the platform for compliance with the standards and/or functioning with other components.

According to an embodiment, Needs Engine 300 (see FIG. 3) passes the need and context details with the relevant association(s) to Context to Module Mapping Engine 330 to dynamically select the list of matching developer modules.

According to an embodiment, a developer module represents all artifacts (including code and configuration) to be built to deliver a feature and/or functionality. The technique of matching could be based on any of the querying mechanisms in the programming paradigm. According to an embodiment, if the Context to Module Mapping Engine is unable to find a mapping developer module, it can communicate this exception to the user, and/or to prospective or respective developers or an appropriate forum on the need leading to new or updated developer modules being added.

Merely for purposes of providing an example, described below is an example of how a newspaper app is created using user context information which includes a user profile. As an initial step, the user expresses a need for a newspaper mobile application. Needs Engine 300 analyzes the need and retrieves one or more "Newspaper" details and/or templates from Needs Definition Repository 310. The Needs Engine sends the retrieved one or more details and/or templates to Context Engine 320, which retrieves the specific context details (e.g., Applied and/or Retrieved) from Context Database 350. The Needs Engine also sends the specific context details to the Context to Module Mapping Engine 330, which uses the Retrieved Context to dynamically identify specific developer modules. For example, a known association with "The Daily" newspaper can be identified. Then, user context information about an interest in Cricket and Football can result in a search for a context match in the developer module database. User context information about an interest in or association with financial markets can result in a search for a context match in the developer module database. Stocks in which the user has invested can result in configuration of the developer module with the associated stock symbols. The Needs Engine sends the specific context details and the list of identified developer modules to the Build Engine 340 to be assembled and built into an installable. The applied context details can also be applied here to be used for specification details, such as Android 4.4 (Mobile OS), Samsung Note 3 (Make), Arial (Font), Black (Font Color), White (Font Background), among many other details. The Needs Engine enables the download of the installable and leads to the installation on the end consumer's mobile device.

At step 140 of the method, a dynamic installable generator component of the mobile application distribution platform generates an installable file from the one or more artifacts or features and makes the installable file available for download. According to an embodiment, Build Engine 340 assembles the identified/selected modules and builds the installable and provides it to Needs Engine 300.

At step 150 of the method, the user downloads the dynamically generated installable file and optionally installs it on the computing device. According to an embodiment, Needs Engine 300 enables the download of the installable and leads to the installation on the end consumer's mobile device. According to an embodiment, each installable interaction can be logged and in the event of an error, an alert can be triggered leading to a detailed review by the platform. Automated diagnostics and test scripts provided by the programmer/developer may be used to isolate errant feature and an alternate programmer-developed similar feature rated as next best can be promoted and used.

According to an embodiment, the method is utilized to dynamically generate a mobile application for an Android operating system-based platform. According to an embodiment, the method results in an APK ("Android application package") file that the user downloads and installs. The downloadable may include various artifacts as part of the installable APK file. For example, the APK file may include folders such as META-INF, lib, res, assets, AndroidManifest.xml, classes.dex, resources.arsc, and one or more other files or folders. According to an embodiment, the programmer creates or modifies these files and folders and uploads them to the platform. The developer needs to share a file called DeveloperModule.xml which contains details on one or more modules or artifacts offered by the developer. According to an embodiment, the schema of the DeveloperModule.xml file can appear as shown in FIG. 4, although many variations are possible.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A method for dynamically assembling a mobile application, the method comprising the steps of:
   receiving a plurality of artifacts from a programmer, wherein the plurality of artifacts comprise elements of mobile applications, and further wherein each of the plurality of artifacts comprises less than an entire mobile application, and further wherein two or more of the plurality of artifacts can be assembled on-demand into a plurality of different mobile applications;
   storing the received plurality of artifacts in an artifacts database;
   receiving, from a user, a request for a dynamically assembled mobile application, the request comprising a plurality of parameters defining a desired output of the dynamically assembled mobile application;
   identifying, using the received plurality of parameters, a template for a mobile application configured to achieve the desired output, comprising the steps of: (i) weighting two or more of the received plurality of parameters with respect to at least one other parameter of the received plurality of parameters to generate a plurality of weighted parameters; (ii) identifying a dependency relationship between two or more of the plurality of weighted parameters; and (iii) choosing the template for the mobile application based on a predetermined association between an element of the plurality of artifacts and a weighted parameter of the plurality of weighted parameters with the greatest assigned weight, and on the identified dependency relationship;
   identifying, using the identified template, a plurality of the artifacts stored in the artifacts database;
   assembling the identified plurality of artifacts into a mobile application comprising an installable file, wherein the assembled mobile application was previously not available to the user; and
   making the installable file available to the user.

2. The method of claim 1, wherein the user request for a dynamically assembled mobile application is expressed via one or more written cues.

3. The method of claim 1, wherein the user request for a dynamically assembled mobile application, is expressed via one or more verbal cues.

4. The method of claim 1, wherein the plurality of parameters defining a desired output of the dynamically assembled mobile application comprise a text font and/or a color for the dynamically assembled mobile application.

5. The method of claim 1, wherein the step of identifying a template for a mobile application comprises a relative positional weight of one or more of the plurality of weighted parameters.

6. The method of claim 1, wherein the step of identifying a template for a mobile application comprises a dependency association weight of one or more of the plurality of weighted parameters.

7. A system for dynamically assembling a mobile application, the system comprising:
   a hardware processor;
   a mobile application distribution platform configured to:
      (i) receive a plurality of artifacts from a programmer, wherein the plurality of artifacts comprise elements of mobile applications, and further wherein each of the plurality of artifacts comprises less than an entire mobile application, and further wherein two or more of the plurality of artifacts can be assembled on-demand into a plurality of different mobile applications; (ii) store the received plurality of artifacts in an artifacts database; and (iii) receive a request from a user for a dynamically assembled mobile application, the request comprising a plurality of parameters defining a desired output of the dynamically assembled mobile application;
   a template database comprising a plurality of mobile application templates; and the artifacts database comprising the plurality of artifacts;
   wherein the mobile application distribution platform, utilizing the processor, is further configured to: (i) identify, using the received plurality of parameters, a template for a mobile application configured to achieve the desired output, comprising the steps of: weighting two or more of the received plurality of parameters with respect to at least one other parameter of the received plurality of parameters to generate a plurality of weighted parameters; identifying a dependency relationship between two or more of the plurality of weighted parameters; and choosing the template for the mobile application based on a predetermined association between an element of the plurality of artifacts and a weighted parameter of the plurality of weighted parameters with the greatest assigned weight, and on the identified dependency relationship; (ii) identify, using the identified template, a plurality of the artifacts stored in the artifacts database; and (iii) assemble the identified plurality of artifacts into a mobile application comprising an installable file, wherein the assembled mobile application installable file was previously not available to the user.

8. The system of claim 7, wherein the user request for a dynamically assembled mobile application is expressed via one or more written cues.

9. The system of claim 7, wherein the user request for a dynamically assembled mobile application is expressed via one or more verbal cues.

10. The system of claim 7, wherein the plurality of parameters defining a desired output of the dynamically assembled mobile application comprise a text font and/or a color for the dynamically assembled mobile application.

11. The system of claim 7, wherein the mobile application distribution platform, utilizing the processor, is further configured to identify a template for a mobile application based at least in part on a dependency association weight of one or more of the plurality of weighted parameters.

12. The system of claim 7, wherein the mobile application distribution platform, utilizing the processor, is further configured to identify a template for a mobile application based at least in part on a relative positional weight of one or more of the plurality of weighted parameters.

13. A computer program product for dynamically assembling a mobile application, the computer program product comprising a computer readable storage medium having program instructions embodied therewith, wherein the computer readable storage medium is not a transitory signal per se, the program instructions readable by a computer to cause the computer to perform a method comprising:
   receiving, by the computer, a plurality of artifacts from a programmer, wherein the plurality of artifacts comprise elements of mobile applications, and further wherein each of the plurality of artifacts comprises less than an entire mobile application, and further wherein two or more of the plurality of artifacts can be assembled on-demand into a plurality of different complete mobile applications;

storing the received plurality of artifacts in an artifacts database;

receiving, by the computer, a request from a user for a dynamically assembled mobile application, the request comprising plurality of parameters defining a desired output of the dynamically assembled mobile application;

identifying, using the received plurality of parameters, a template for a mobile application configured to achieve the desired output, comprising the steps of: (i) weighting two or more of the received plurality of parameters with respect to at least one other parameter of the received plurality of parameters to generate a plurality of weighted parameters; (ii) identifying a dependency relationship between two or more of the plurality of weighted parameters; and (iii) choosing the template for the mobile application based on a predetermined association between an element of the plurality of artifacts and a weighted parameter of the plurality of weighted parameters with the greatest assigned weight, and on the identified dependency relationship;

identifying, using the identified template, a plurality of the artifacts stored in the artifacts database;

assembling the identified plurality of artifacts into a mobile application comprising an installable file, wherein the assembled mobile application was previously not available to the user; and making, by the computer, the installable file available to the user.

14. The computer program product of claim 13, wherein the user request for a dynamically assembled mobile application is expressed via one or more written cues.

15. The computer program product of claim 13, wherein the user request for a dynamically assembled mobile application is expressed via one or more verbal cues.

16. The computer program product of claim 13, wherein the plurality of parameters defining a desired output of the dynamically assembled mobile application comprise a text font and/or a color for the dynamically assembled mobile application.

17. The computer program product of claim 13, wherein the step of identifying a template for a mobile application comprises a relative positional weight of one or more of the plurality of weighted parameters.

18. The computer program product of claim 13, wherein the step of identifying a template for a mobile application comprises a dependency association weight of one or more of the plurality of weighted parameters.

* * * * *